US009026658B2

(12) United States Patent
Xu et al.

(10) Patent No.: US 9,026,658 B2
(45) Date of Patent: May 5, 2015

(54) ENHANCED COMPUTER CLUSTER OPERATION USING RESOURCE ALLOCATION REQUESTS

(75) Inventors: Mingqiang Xu, Shanghai (CN); Jun Su, Shanghai (CN); Qiufang Shi, Shanghai (CN); Lanlan Cong, Shanghai (CN); Tao Huang, Shanghai (CN); Zhen Wei, Shanghai (CN)

(73) Assignee: Microsoft Technology Licensing, LLC, Redmond, WA (US)

( * ) Notice: Subject to any disclaimer, the term of this patent is extended or adjusted under 35 U.S.C. 154(b) by 47 days.

(21) Appl. No.: 13/432,177

(22) Filed: Mar. 28, 2012

(65) Prior Publication Data

US 2013/0262556 A1    Oct. 3, 2013

(51) Int. Cl.
*G06F 15/173* (2006.01)
*H01R 4/56* (2006.01)

(52) U.S. Cl.
CPC ........................................ *H01R 4/56* (2013.01)

(58) Field of Classification Search
USPC .............. 709/202, 203, 224, 225, 226; 718/1, 718/100–106
See application file for complete search history.

(56) References Cited

U.S. PATENT DOCUMENTS

| | | | | |
|---|---|---|---|---|
| 7,376,693 | B2* | 5/2008 | Neiman et al. ................. | 709/201 |
| 2006/0224741 | A1* | 10/2006 | Jackson ......................... | 709/226 |
| 2009/0300210 | A1 | 12/2009 | Ferris | |
| 2009/0300607 | A1* | 12/2009 | Ferris et al. ........................ | 718/1 |
| 2010/0223618 | A1* | 9/2010 | Fu et al. ......................... | 718/102 |
| 2010/0287280 | A1* | 11/2010 | Sivan ............................. | 709/226 |
| 2010/0322255 | A1 | 12/2010 | Hao et al. | |
| 2011/0016214 | A1 | 1/2011 | Jackson | |
| 2011/0029882 | A1 | 2/2011 | Jaisinghani | |
| 2011/0078303 | A1 | 3/2011 | Li et al. | |
| 2012/0131591 | A1* | 5/2012 | Moorthi et al. ............... | 718/104 |
| 2012/0331144 | A1* | 12/2012 | Supalov ......................... | 709/226 |
| 2013/0185731 | A1* | 7/2013 | Barsness et al. .............. | 718/105 |

OTHER PUBLICATIONS

Buyya, et al., "InterCloud: Utility-Oriented Federation of Cloud Computing Environments for Scaling of Application Services", In Proceedings of the 10th International Conference on Algorithms and Architectures for Parallel Processing , May 21-23, 2010, 19 pages.
Marshall, et al., "Improving Utilization of Infrastructure Clouds", In Proceedings of IEEE/ACM Cloud Computing, May 2011, 10 pages.

(Continued)

*Primary Examiner* — Joon H Hwang
*Assistant Examiner* — Cheikh Ndiaye
(74) *Attorney, Agent, or Firm* — Kate Drakos; Micky Minhas (57) ABSTRACT

The subject disclosure is directed towards automatically managing job request execution for a computer cluster using cloud computing resource allocations. When client computers to the computer cluster submit job requests to a head node, a set of job requests is selected based on a policy. The head node converts the set of job requests into a set of resource allocation requests based on job specification data. After communicating the resource allocation requests to a cloud computing provider, the head node is granted access and control over one or more worker nodes as a response. The worker nodes proceed to execute the set of job requests and update the head node with status information once the execution finishes.

20 Claims, 7 Drawing Sheets

(56) References Cited

OTHER PUBLICATIONS

Schott, et al., "Improved Infrastructure Accessibility and Control with LSF for LS-DYNA", In Proceedings of 4th European LS-DYNA Users Conference, May 22-23, 2003, 8 pages.

Calheiros, et al., "The Aneka Platform and QoS-driven Resource Provisioning for Elastic Applications on Hybrid Clouds", In Journal of Future Generation Computer Systems, 2011, 10 pages.

* cited by examiner

ENHANCED COMPUTER CLUSTER OPERATION USING RESOURCE ALLOCATION REQUESTS

BACKGROUND

Organized groupings of computers, which may be known as computer clusters, use inexpensive server computers to provide high-performance computing (HPC) capabilities to client computing devices. These computing devices submit job requests to these server computers, which are commonly referred to as nodes. Each job request refers to a set of (processing) tasks to be scheduled for execution. An example job request may consist of a single task or multiple tasks. The server computers may execute these tasks serially as single processes or in parallel as multiple processes. Certain server computers may be reserved exclusively for a particular class of job requests or tasks while other server computers may be available for any job request/task.

As computational demands increase, it is often inefficient and costly for an enterprise to expand on-premise computer cluster capacity to satisfy evolving client needs. One approach is to leverage services from cloud computing providers. Instead of adding new hardware or licensing more software, the organization may simply lease computing resource capabilities for a certain time period. Once the computer cluster acquires access to the cloud computing resources, job request execution commences in accordance with a policy.

One policy is to directly forward job requests from the computer cluster to the cloud computing provider based on various pre-defined parameters/conditions. With this policy, however, the computer cluster cannot determine job request execution status or monitor progress. Another policy is to lease computing resource capacities from the cloud computing provider in anticipation of job request demands. While monitoring job request execution progress is possible with this approach, computing resource leasing cannot be performed dynamically and central control over the leased resources is frustrated.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, various aspects of the subject matter described herein are directed towards automatically managing job request execution for a computer cluster. In one aspect, a head node within the computer cluster may direct resource allocations from a cloud computing provider to execute one or more job requests from one or more client computers. The head node may request cloud computing resources as needed for a current job request load. With the benefit of being detached from the micro-management of the cloud computing resources, the head node may control resource utilization to satisfy actual computational demands of the client computers.

In another aspect, the head node may include an administration mechanism that is configured to convert pending job requests into resource allocation jobs that result in an efficient execution of the pending job requests. In one aspect, when each resource allocation request directly maps to one job request, the cloud computing provider may accurately determine an appropriate resource/node configuration to improve job request performance even though the cloud computing provider may not actually be aware of job-request specific requirements/tasks.

In one aspect, the administration mechanism selects at least a portion of the pending job requests for execution based on a policy. The administration mechanism may communicate at least a portion of the resource allocation requests to the cloud computing provider, which responds by enabling access to nodes (e.g., computing devices) that control access to and operation of requested cloud computing resources. The administration mechanism may instruct these nodes to execute one or more job requests. In one aspect, the administration mechanism may monitor performance and resource utilization of these nodes when executing the one or more job requests. In another aspect, the administration mechanism may direct the job request execution based on a policy. The administration mechanism may distribute tasks for each job request amongst the nodes by instructing each node to perform specific tasks based on available resource capacities and/or capabilities.

As the nodes perform operations executing the tasks, the administration mechanism may maintain current status information associated with these job requests. As an example, a proxy device automatically notifies the administration when change in status occurs. When the cloud computing provider charges the computer cluster for the resource utilization, the administration mechanism may compare the status information with billing data and determine whether the cloud computing provider accurately billed for the job request execution.

Other advantages may become apparent from the following detailed description when taken in conjunction with the drawings.

BRIEF DESCRIPTION OF THE DRAWINGS

The present invention is illustrated by way of example and not limited in the accompanying figures in which like reference numerals indicate similar elements and in which.

DETAILED DESCRIPTION

Various aspects of the technology described herein are generally directed towards job request administration within a computer cluster. In one example implementation, a head node within the computer cluster receives a job request from a client computer and extracts various information indicating one or more desired resources (e.g., hardware and software components), an identification (ID) number, a priority, an expected completion time and/or the like. The head node may convert the job request into a resource allocation request that describes the desired resources. The head node may instruct a cloud computing provider to instantiate a set of virtual machines in accordance with the resource allocation request. The set of virtual machines, by way of example, may include an application installation and sufficient capacities of various hardware resources (e.g., memory, hard disk storage, CPU cores/cycles and/or the like), enabling successful execution of the job request. In one example implementation, the set of virtual machines may also include a subset that is a duplicate of another subset as fault-tolerance measure ensuring job request execution through redundancy.

The head node may instruct the set of virtual machines to execute the job request by distributing corresponding tasks to different virtual machines. Once the corresponding tasks have completed, the set of virtual machines communicates status information to the client computer. The resource allocation request and the status information may be used later to audit a bill from the cloud computing provider for services rendered including the set of virtual machines and any component thereof, a compute time related to the job request execution, any data transfer amount and so forth.

It should be understood that any of the examples herein are non-limiting. As such, the present invention is not limited to any particular embodiments, aspects, concepts, structures, functionalities or examples described herein. Rather, any of the embodiments, aspects, concepts, structures, functionalities or examples described herein are non-limiting, and the present invention may be used various ways that provide benefits and advantages in computing and computing job management in general.

Figure 1:
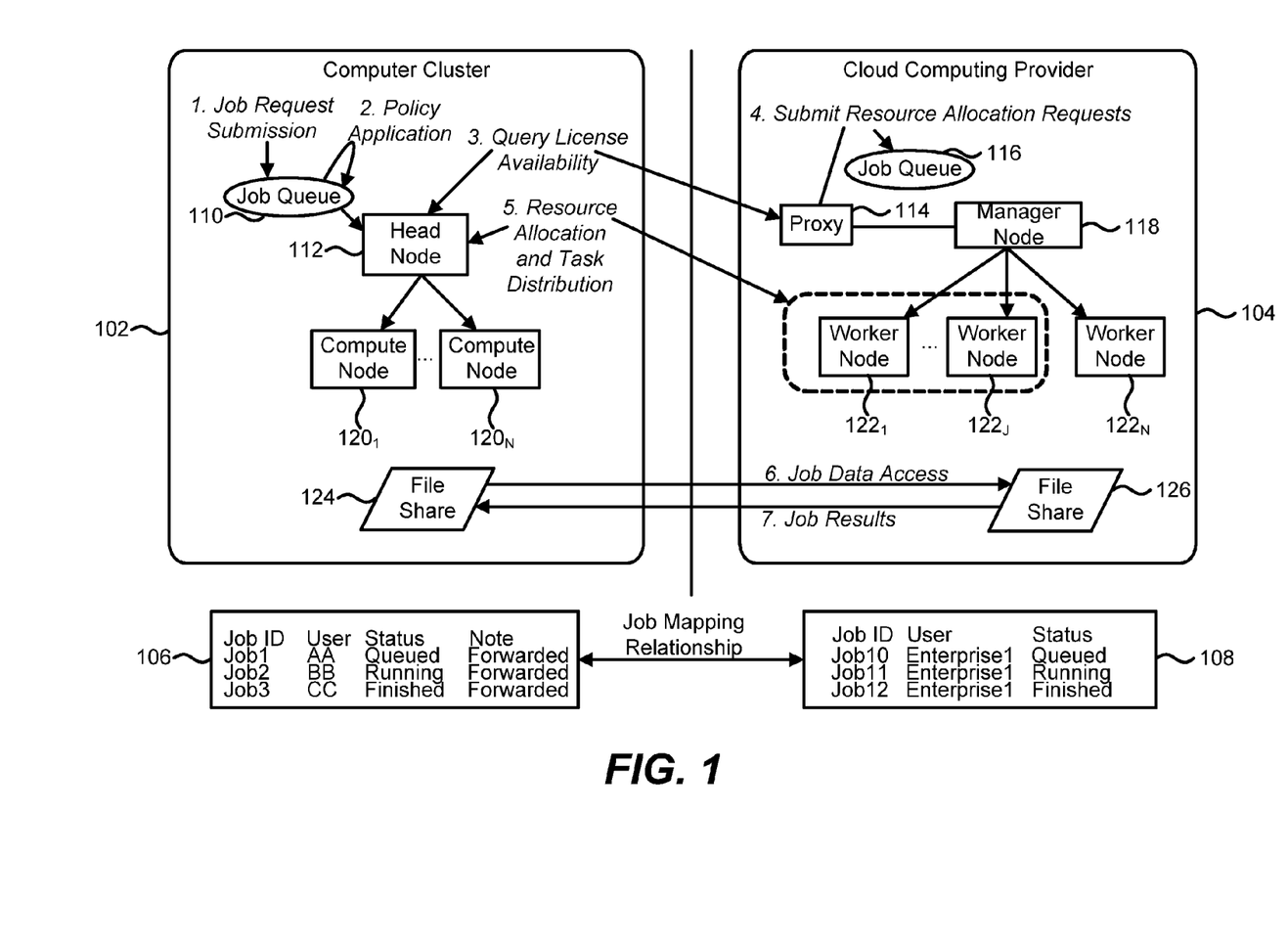
FIG. 1 is a block diagram illustrating an example system for managing performance of job requests according to one example implementation.

FIG. 1 is a block diagram illustrating an example system for managing performance of job requests according to one example implementation. Components of the example system may include a computer cluster 102 (e.g., Microsoft® Windows® Server, Windows® High Performance Computing Server, Windows® Compute Cluster Server and/or the like) and a cloud computing provider 104 (e.g., Microsoft® Windows® Azure™ and/or the like). The computer cluster 102 in general may include various computing devices configured to communicate data with each other, or with other computing devices, via a data network (e.g., a local area network), to share storage space and programs and/or to run distributed processes.

The various computing devices, which may be referred to hereinafter as nodes, may couple to a plurality of client computers/workstations that submit a plurality of job requests 106 for execution. The computer cluster 102 may execute the plurality of job requests 106 via a transformation into a plurality of resource allocation requests 108, which causes the cloud computing provider 104 to lease various (computing) resources according to one example implementation. An example resource may refer a capacity, such as an amount of memory, such as volatile/non-volatile memory, a number of processor cycles, a fraction of network bandwidth and/or the like.

FIG. 1 also includes a functional depiction of job request execution administration. In one example implementation, after a recordation of each job request submission in a job queue 110, a policy corresponding to a head node 112 may be used to select one or more of the plurality of job requests 106 for execution. For example, the head node 112 may select at least one job request having a highest priority or a longest waiting time (e.g., processing time). The head node 112 queries a proxy 114 of the cloud computing provider 104 as to which computing resource and/or at what capacity may be available and/or what licensing scheme may be applicable. Based on this information, the head node 112 converts the selected ones of the plurality of job requests 106 into corresponding ones of the plurality of resource allocation requests 108 and submits each resource allocation request to a job queue 116 within the cloud computing provider 104.

In response, a manager node 118 within the cloud computing provider 104 may execute the corresponding ones of the plurality of resource allocation requests 108 and lease various computing resources to the computer cluster 102 of which the head node 112 may utilize when executing tasks that form each selected job request. Each task generally refers to a discrete unit of a job request that comprises one or more data operations/computations. In one example implementation, the head node 112 may partition the selected ones of the jobs requests 106 into a first set of tasks that may be executed locally on a plurality of compute nodes $120_{1...N}$ (hereinafter referred to as the compute nodes 120) and a second set of tasks that may be executed remotely on a plurality of worker nodes $122_{1...J}$ (hereinafter referred to as the worker nodes 122). The head node 112 may distribute the first set of tasks amongst one or more of the compute nodes 120 and the second set of tasks amongst one or more of the worker nodes 122. The head node 112, by way of example, may select a particular node based on resource availability as dictated by the policy. Alternatively, all of the tasks may be performed by the worker nodes 122 or a portion thereof.

As another alternative, the head node 112 may submit the selected ones of the plurality of job requests 106 along with corresponding job specification data to the proxy 114, which proceeds to determine cloud computing resource availability. In one example implementation, the proxy 114 may identify a number of virtual machines within the cloud computing provider 104 having one or more necessary components (e.g., a software component or a hardware component) for performing a specific job request. For instance, the proxy 114 may determine that a particular virtual machine is indeed provisioned with a sufficient amount of storage space and/or a critical software program (e.g., important financial/banking software) for performing operations corresponding to the selected ones of the plurality of job requests 106. Accordingly, the proxy 114 may convert the specific job request into a corresponding resource allocation request for the particular virtual machine to which the cloud computing provider 104 responds by allocating the particular virtual machine as a node to the head node 112.

In one example implementation, the head node 112 may assign tasks (e.g., data processing tasks) to a particular worker node $122_1$ and configure another worker node $122_2$ to function as a redundant computing device in the event of a fault, such as a software error or a hardware failure. The head node 112 may instruct the particular worker node $122_1$ to perform desired computations, processes and other operations for completing the assigned tasks. In response to a fault, the head node 112 may instruct the particular worker node $122_1$ to cease performance of these operations and instruct the other worker node $122_2$ to commence execution of remaining assigned tasks.

On behalf of the head node 112 and the client computers, the worker nodes 122 may perform various data processing/storage operations corresponding to the selected ones of the plurality of job requests 106. These operations may require access to job data stored in a file share 124. According to one example implementation, the computer cluster 102 may instruct the worker nodes 122 to perform various additional operations related to a current job request. An example instruction may require that the worker nodes 122 open and initialize various services including ones that embody a service oriented application (SOA). These services may be implemented using Microsoft® Windows® Communication Foundation (WCF), thereby enabling exposure of corresponding operations via a communication protocol, such as SOAP or REST. In one example implementation, the proxy 114 may relay queries to such services from the client computer desiring current information, such as proprietary information, computation data, important medical care information, recent financial data and/or the like. The proxy 114 may also relay other data, such as a current status of a job request execution or a queued resource allocation request.

The worker nodes 122 may represent one or more physical computing devices or virtual machines capable of controlling access to and utilization of more specific cloud computing resources, such as hardware and/or software components. An example worker node may be one or more instance of a virtual machine that is isolated from other worker nodes and configured to run an application exclusively for client computers of the computer cluster 102. The application may be designed to execute at least a portion of an associated job request. A group of example worker nodes may form a virtual network to which the proxy 114 delivers data messages from the client computers, the compute nodes 120, the head node 112, other worker nodes, the Internet and/or the like.

As an example, a fabric controller within the cloud computing provider 104 assigns a set of roles (e.g., worker roles or web roles) associated with the application to different virtual machines. The head node 112 also may issue commands to provision additional virtual machines with duplicate application instances. Since a single hardware failure most likely will not take down the entire application, the additional virtual machines improve overall fault-tolerance through redundancy. The fabric controller also monitors each running application instance. If an instance fails, the fabric controller starts a new application instance with a same set of roles within a specified time defined by the policy. Furthermore, because each instance has one or more dedicated processor cores, a total job request execution time may be predictable.

In one example implementation, the job data corresponding to the selected ones of the plurality of job requests 106 and stored within the file share 124 may be transferred to or accessed through file share 126. At least one of the worker nodes 122 may perform various operations on the job data through consumption of the allocated resource capacities. As these operations are being completed, the cloud computing provider 104, via the proxy 114, communicates current status information associated with the selected ones of the plurality of job requests 106, thereby permitting the head node 112 to continuously monitor job request performance, control resource utilization and/or assess cost-effectiveness of the cloud computing resource allocations.

According to one example implementation, the computing resource allocations may refer to resource capacity (e.g., storage space size, virtual machine size/number, cache size, database size, processor core size, inbound/outbound data transfer size and/or the like), capability (e.g., fault-tolerance, security, web application hosting, backend application migration/utilization, proprietary database access/storage, virtual network management and/or the like), time (e.g., data transfer time, compute time, and/or the like) and so forth. Because of the status information synchronization and the resource utilization control measures, the head node 112 is capable of verifying the accuracy of charges for any cloud computing resource allocation. For example, the cloud computing provider 104 may charge the computer cluster 102 per compute hour, which is measured from application deployment to release. By computing an amount of elapsed time between the resource allocation request communication and the subsequent release of a virtual machine, the head node 112 may determine whether a charge for such compute instance is appropriate or irregular.

Figure 2:
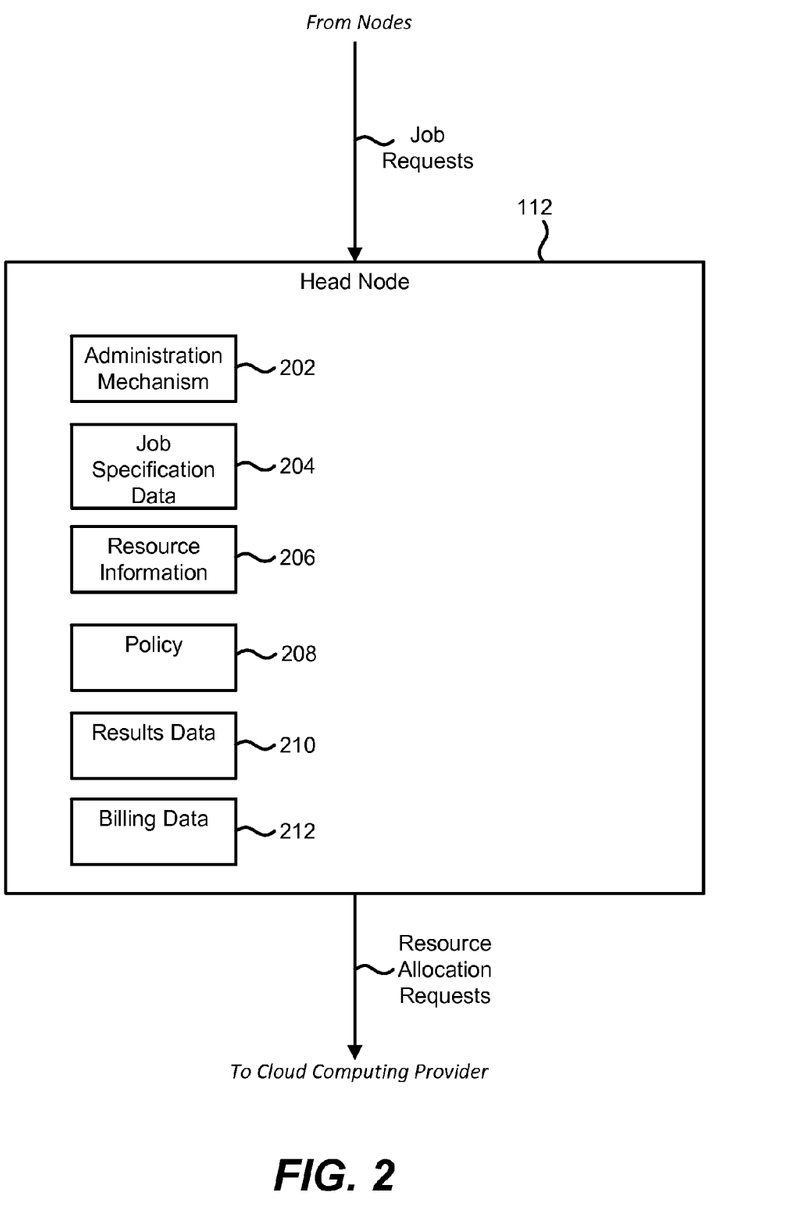
FIG. 2 is a block diagram illustrating an example head node for job request administration within a computer cluster according to one example implementation.

FIG. 2 is a block diagram illustrating an example head node for job request administration within a computer cluster according to one example implementation. In one example implementation, the example head node may include the head node 112 of FIG. 1. When nodes (e.g., computing devices) within the computer cluster communicate job requests, an administration mechanism 202 within the example head node may use various job request related information to allocate sufficient resource capacities for executing the job requests, as described herein.

Such job request related information, for example, may include job specification data 204, which stores minimum resource capacities for timely/economic job request execution. A resource capacity below such thresholds may cause poor job request performance. Optionally, the job specification data 204 may indicate certain resource capacities for achieving optimal job request performance. When the administration mechanism 202 correlates the job specification data 204 with resource information 206, which indicates available resource capacities within the (local) computer cluster, the administration mechanism 202 determine which job request(s) to execute and/or whether a particular job request can be executed.

In one example implementation, the administration mechanism 202 may examine a (computer cluster) policy 208 to select one or more job requests to be executed using cloud computing resources. Based on the policy 208, according to another example implementation, the administration mechanism 202 may select one or more specific cloud computing providers to request resource allocations and assign certain ones of the job requests for execution. For example, the administration mechanism 202 may match a particular job request with a cloud computing provider capable of efficient/expeditious execution, such as the cloud computing provider having a set of resources that meet or surpass the capacities indicated by the job specification data 204.

After selecting the cloud computing provider and/or the one or more job requests, the administration mechanism 202 may generate one or more resource allocation requests for communication to the cloud computing provider. Via the one or more resource allocation requests, the administration mechanism 202 may instruct the cloud computing provider to prepare a requested computed resource configuration for access (e.g., exclusive access) and utilization in one example implementation. Once access is provided to such a configuration, the administration mechanism 202 communicates information associated with executing the one or more job requests. The administration mechanism 202 may also utilize local resources within the computer cluster for the job request execution according to one alternative implementation.

The administration mechanism 202 may receive various data, such as a heartbeat indicating health of local and assigned nodes and status information associated with job request execution. In one example implementation, results data 210 corresponding to cloud computing provider performance and/or resource utilization during the job request execution may be stored within the head node 112. The administration mechanism 202 may use the results data 210 to perform a diagnostic examination of the cloud computing provider and/or the nodes within the computer cluster. By collecting the results data 210 over a time period, the administration mechanism 202 may automate an assessment of each cloud computing (service/resource) provider. Such an assessment may update historical billing data within the policy 208 and improve future job request management and performance.

Another mechanism for assessing cloud computing provider performance includes auditing billing data 212 related to one or more services rendered. The cloud computing provider may record charges in the billing data 212 (e.g., in US currency amounts) for resource allocations and/or job request execution and communicate the billing data 212 to the head node 112. The administration mechanism 202 may compare the charges to the results data 210 to measure provider effectiveness when rendering such cloud computing services. Based on this comparison, in one example implementation, the administration mechanism 202 may identify one or more irregularities associated with the billing data 212, such as instances when the cloud computing provider invoiced an unrequested service, included various hidden fees, overbilled on a particular rendered service, never performed a requested service and/or the like.

Figure 3:
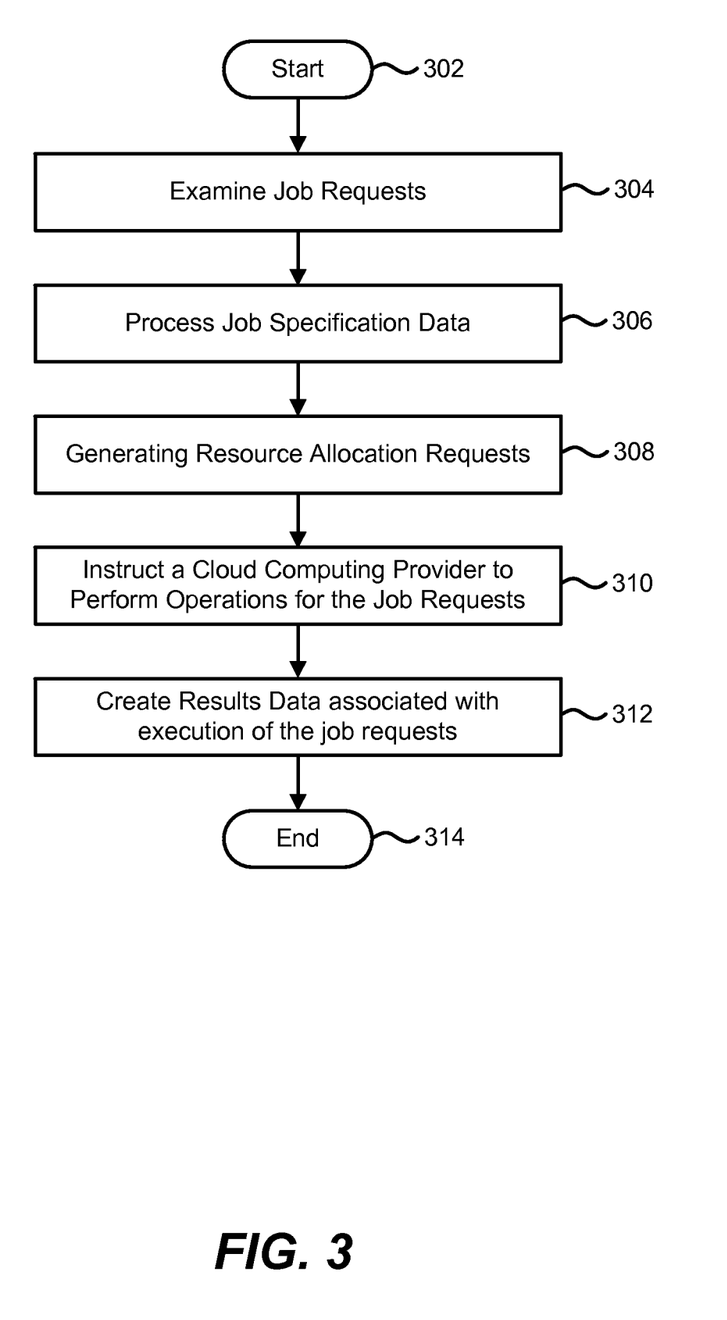
FIG. 3 is a flow diagram illustrating example steps for converting job requests into resource allocation requests for a cloud computing provider according to one example implementation.

FIG. 3 is a flow diagram illustrating example steps for converting job requests into resource allocation requests for a cloud computing provider according to one example implementation. In one example implementation, the head node 112 of FIG. 1 may perform one or more steps of FIG. 3. The example steps depicted in FIG. 3 commence at step 302 and proceed to step 304 at which a plurality of job requests may be received from one or more computing devices (e.g., client devices or nodes) and examined.

Step 306 refers to processing job specification data associated with the job requests. In one example implementation, the administration mechanism 202 within the head node 112 determines various computing resource capacities necessary for the execution of each job request and/or matching resource license availability, such as whether the cloud computing provider 104 can allocate a number of valid software licenses to satisfy resource needs of the job requests. Examples of such computing resources include hard drive storage space, memory cache and/or processor cycles. The job specification data may accordingly indicate that a particular job request needs at least a specified number of gigabytes (e.g., five (5) GB) of storage space to operate efficiently. The job specification data also may identify that the particular job request requires a higher number of gigabytes to perform more optimally.

Step 308 represents resource allocation request generation, based on the job specification data, and communication to the cloud computing provider. According to one example implementation, the administration mechanism 202 produces one or more such requests for various computing resources that may facilitate execution of the job requests. As an example, after receiving a certain resource allocation request, the cloud computing provider may provision one or more computing devices (e.g., worker nodes) as access control mechanisms for storage space, processor cycles, software programs, hardware devices and/or other computing resources.

Step 310 refers to instructing the cloud computing provider to perform various operations corresponding to the job requests. The administration mechanism 202 may employ various job request selection/prioritization mechanisms, such as those described for FIG. 2, which direct job request execution during step 310. According to one example implementation, the administration mechanism 202 may execute the operations in parallel across one or more worker nodes within the cloud computing provider. One or more local compute nodes associated with the head node 112 may support the performance of the one or more worker nodes. Step 312 refers to creating results data associated with the execution of the job requests. For example, the one or more worker nodes may utilize processor cycles to perform the operations and store the results data in storage space, which may be transferred, once completed, to local storage space within the head node 112. Step 314 terminates the steps described in FIG. 3.

Figure 4:
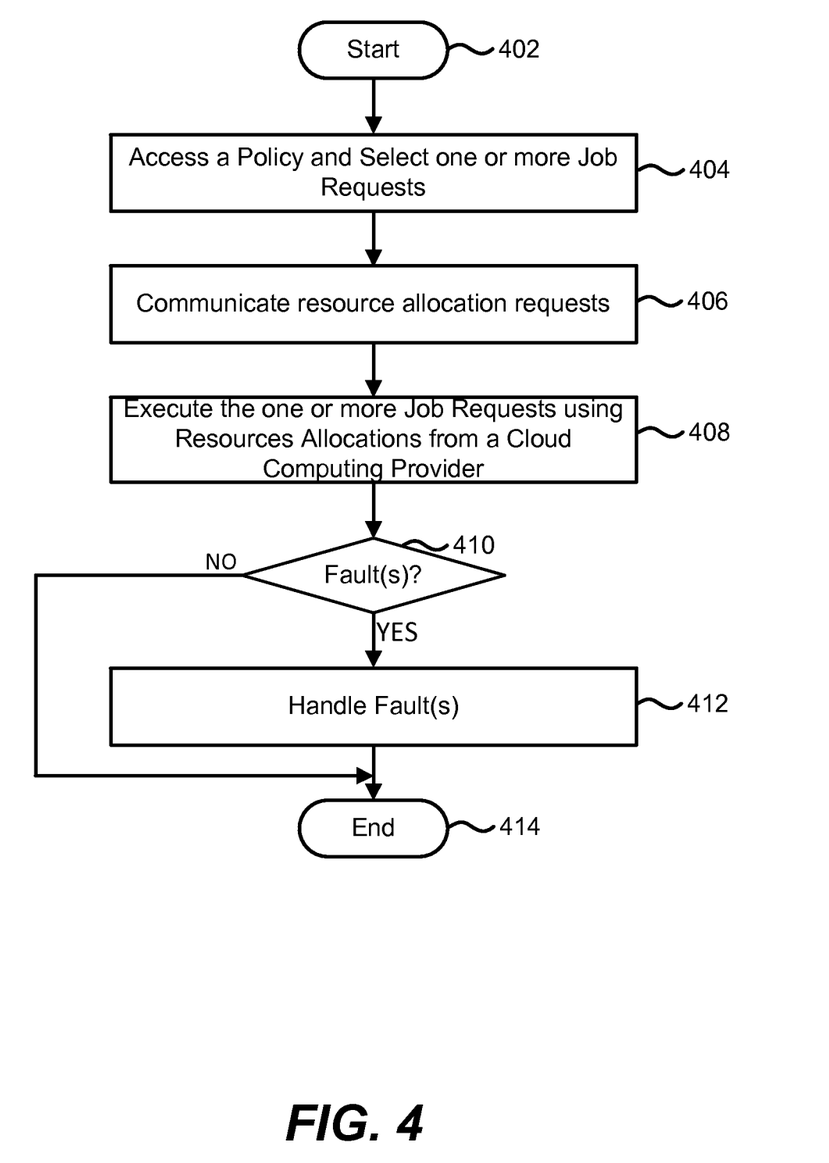
FIG. 4 is a flow diagram illustrating example steps for monitoring performance of job requests within a computer cluster according to one example implementation.

FIG. 4 is a flow diagram illustrating example steps for monitoring performance of job requests within a computer cluster according to one example implementation. In one example implementation, the administration mechanism 202 of FIG. 2 may perform one or more steps of FIG. 4. The example steps depicted in FIG. 4 commence at step 402 and proceed to step 404 when the administration mechanism 202 accesses a policy and selects one or more job requests from a group of pending job requests submitted by a plurality of computing devices.

As described herein, the policy may include parameters for determining which job request to select for execution. As an example, the administration mechanism 202 selects each pending job request having a certain priority. As another example, the administration mechanism 202 may select each pending job request that does or, alternatively, does not require a certain computing resource. As yet another example, the administration mechanism 202 may identify each pending job request having an execution time (e.g., processing/wait time) that is projected to be equal to or exceed a pre-defined total execution time period. The administration mechanism 202, alternatively, may select each pending job request having an estimated execution time that is quicker than the pre-defined time period. The administration mechanism 202, in another example implementation, may select a job request that corresponds to one or more software license. The administration mechanism 202 may also select the one or more job requests for execution using a combination of any of the above example parameters.

Step 406 is directed to communicating resource allocation requests corresponding to executing the one or more job requests. In one example implementation, the administration mechanism 202 may generate the resource allocation requests based on the policy. These requests, for example, may indicate one or more cloud computing resources (e.g., a hardware device, a software program and/or the like) that are sufficient for performing the one or more job requests. Alternatively, the one or more cloud computing resource caps may include various capacities (e.g., a number of CPU/GPU cycles) and/or capabilities (e.g., utilization of a particular software program version) that result in an optimal performance of the one or more job requests.

In response to the resource allocation requests from the administration mechanism 202, the cloud computing provider may enable access to the cloud computing resources via one or more worker nodes. Step 408 is directed to executing the one or more job requests using the cloud computing resource allocations. During the execution of a certain job request, the administration mechanism 202 may instruct the one or more worker nodes to perform corresponding tasks in chronological order. For example, the one or more worker nodes may use a particular software program to process source data and produce target data, while consuming processor cycles and memory. As another example, a requesting node within a computer cluster may desire access to functionality provided by a graphics adaptor/processor unit (e.g., a hardware device that renders computer graphic objects for display). The administration mechanism 202 presents the requesting node with a configuration simulating such a device, which enables access to and/or control over the functionality as if the graphics adaptor/processing unit were a local device. Such a configuration also enables interaction with rendered graphical objects as if these objects were stored locally or in a networked storage location within the computer cluster.

Step 410 refers to determination as to whether any faults are raised during the execution of the one or more job requests. If the administration mechanism 202 does not detect any faults, step 410 proceeds to step 414 at which the steps depicted in FIG. 4 terminates. If the administration mechanism 202 detects one or more faults, step 410 proceeds to step 412. Step 412 is directed to handling the one or more faults using various fault tolerance techniques. Fault tolerance generally refers to a system's ability to handle defects, failures or malfunctions via software, hardware or a combination of both, in which normal functionality continues with at the most a minor disruption. Such a system may be classified as either highly reliable or highly available. Highly reliable systems may be used to perform a time-intensive function in which repair activities cannot take place or in which even a small amount of downtime for the repairs activities cannot be tolerated. Highly available systems are used to perform a time-critical function at the moment the function is needed without significant delays or denials of service and without serious consequences.

By implementing one of various fault tolerance techniques, the administration mechanism 202 permits the compute node to continue with job request execution despite the presence of defects. In one example implementation, the administration mechanism 202 may employ two or more duplicate or redundant computing resource configurations to handle faults effectively. In the event of a system failure or a power failure, the administration mechanism 202 may fail over the job request execution to another computing resource configuration (e.g., a backup or other such compute node). When a storage system (e.g., a hard disk) fails, the administration mechanism 202 may access a backup storage system (e.g., a mirrored disk), recover any lost data and/or restart data transfers. The administration mechanism 202 within the head node 112 may coordinate multiple processors to compare input data and output data for errors and to correct any detected errors. In response to a software error/fault, the administration mechanism 202 may migrate the current computations/operations to a same or different software version running on another compute node.

Figure 5:
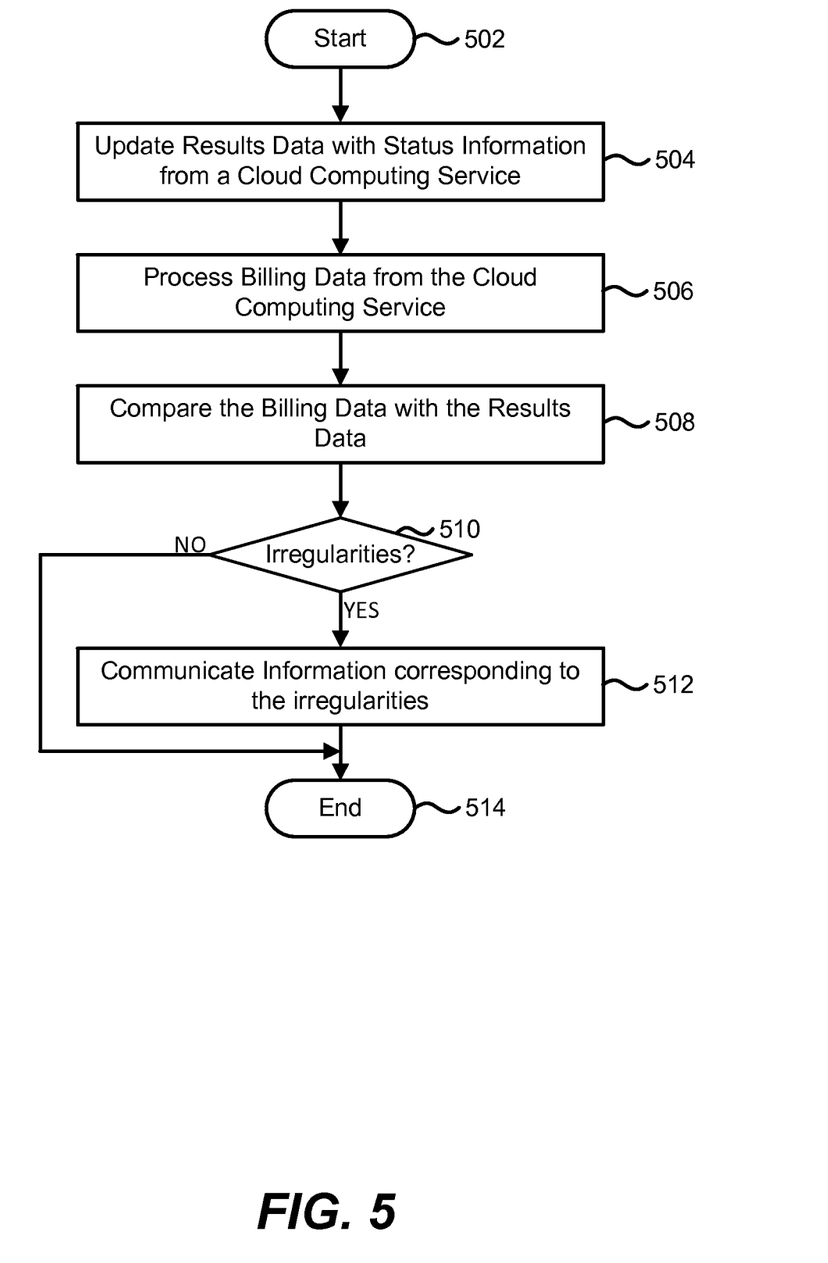
FIG. 5 is a flow diagram illustrating example steps for auditing billing data for resource allocations from a cloud computing provider according to one example implementation.

FIG. 5 is a flow diagram illustrating example steps for auditing billing data for resource allocations from a cloud computing provider according to one example implementation. The administration mechanism 202 of FIG. 2 may perform one or more steps of FIG. 5. In one example implementation, the administration mechanism 202 may be embodied within the head node 112 of the computer cluster 102 of FIG. 1.

The example steps depicted in FIG. 5 commence at step 502 and proceed to step 504 when the administration mechanism 202 updates results data with status information associated with job request performance. The cloud computing provider 104 may communicate the status information to the head node 112 indicating that a particular job request is finished, queued/pending, currently running and/or another status indicator (e.g., failed, cancelled, paused and/or the like). In one example implementation, the results data also indicate performance-related data including total processing time, resource utilization statistics, detected faults (e.g., software errors or hardware failures) and/or the like.

Step 506 is directed to receiving and processing billing data from the cloud computing provider. The billing data generally includes charges for services rendered, both collectively and individually. These charges may be one-time (e.g., price per unit of a computing resource), recurring charges (e.g., monthly fees) or based upon other such billing concepts. Step 508 refers to comparing the billing data with the results data. According to one example implementation, the administration mechanism 202 matches job requests and/or resource allocation requests with the services rendered by the cloud computing provider. The administration mechanism 202 may identify an allocated computing resource capacity and time within the billing data that corresponds with executing a particular job request.

Step 510 determines whether there are any irregularities with the billing data. If the administration mechanism 202 identifies one or more irregularities, step 510 proceeds to step 512. If the administration mechanism 202 fails to identify an irregularity with the billing data, step 510 proceeds to step 514 because the billed charges are most likely appropriate. Step 512 refers to communicating information corresponding to the one or more irregularities. In one example implementation, each irregularity refers to an instance when the cloud computing provider 104 incorrectly billed the computer cluster 102. As an example, the communicated information may identify charges for an unrequested service (e.g., a resource capacity/time allocation and/or the like), various hidden fees or over-charges for a previously rendered service. As another example, the communicated information may identify a requested service of which the cloud computing provider never performed. After step 512, the administration mechanism 202 proceeds to step 514 at which the billing data auditing method terminates.

Example Networked and Distributed Environments

One of ordinary skill in the art can appreciate that the various embodiments and methods described herein can be implemented in connection with any computer or other client or server device, which can be deployed as part of a computer network or in a distributed computing environment, and can be connected to any kind of data store or stores. In this regard, the various embodiments described herein can be implemented in any computer system or environment having any number of memory or storage units, and any number of applications and processes occurring across any number of storage units. This includes, but is not limited to, an environment with server computers and client computers deployed in a network environment or a distributed computing environment, having remote or local storage.

Distributed computing provides sharing of computer resources and services by communicative exchange among computing devices and systems. These resources and services include the exchange of information, cache storage and disk storage for objects, such as files. These resources and services also include the sharing of processing power across multiple processing units for load balancing, expansion of resources, specialization of processing, and the like. Distributed computing takes advantage of network connectivity, allowing clients to leverage their collective power to benefit the entire enterprise. In this regard, a variety of devices may have applications, objects or resources that may participate in the resource management mechanisms as described for various embodiments of the subject disclosure.

Figure 6:
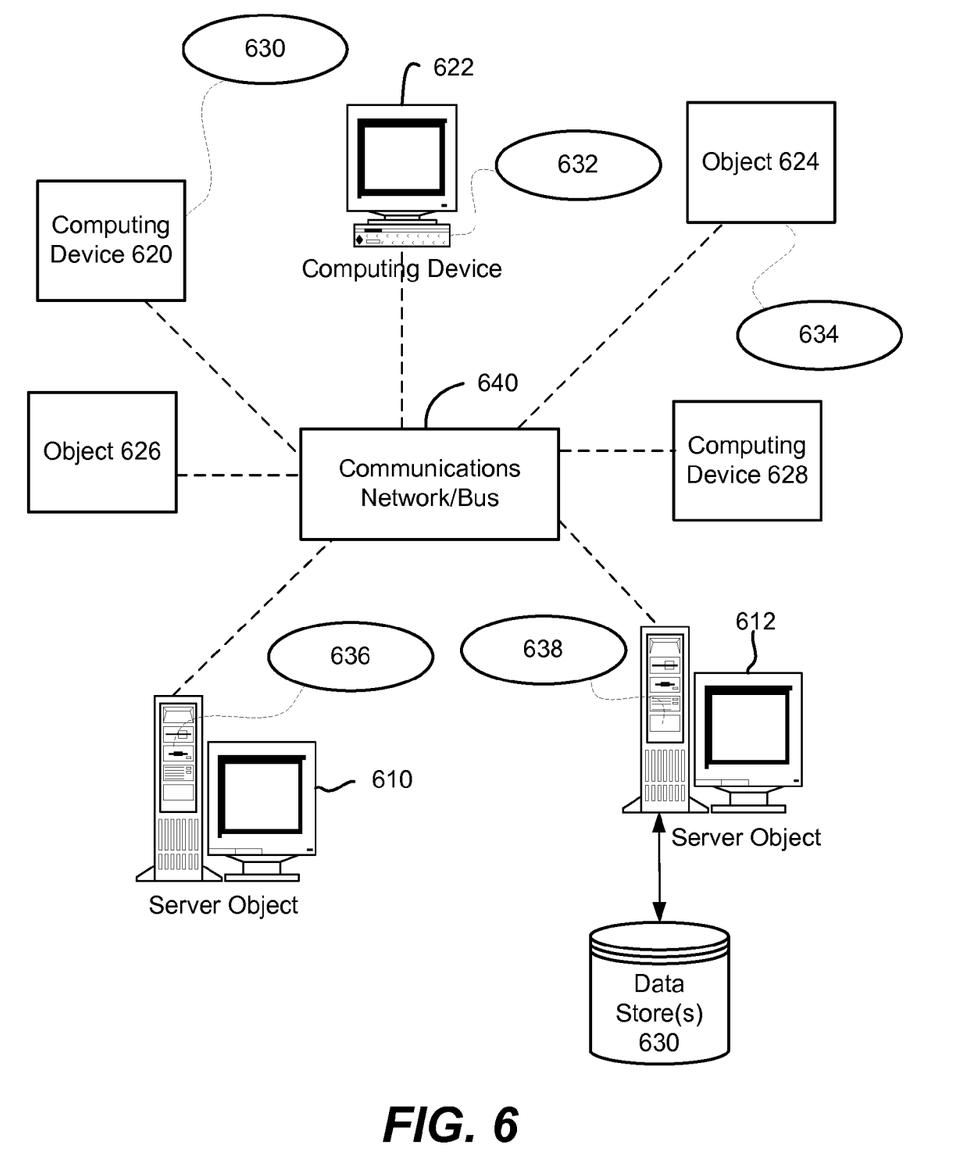
FIG. 6 is a block diagram representing example non-limiting networked environments in which various embodiments described herein can be implemented.

FIG. 6 provides a schematic diagram of an example networked or distributed computing environment. The distributed computing environment comprises computing objects 610, 612, etc., and computing objects or devices 620, 622, 624, 626, 628, etc., which may include programs, methods, data stores, programmable logic, etc. as represented by example applications 630, 632, 634, 636, 638. It can be appreciated that computing objects 610, 612, etc. and computing objects or devices 620, 622, 624, 626, 628, etc. may comprise different devices, such as personal digital assistants (PDAs), audio/video devices, mobile phones, MP3 players, personal computers, laptops, etc.

Each computing object 610, 612, etc. and computing objects or devices 620, 622, 624, 626, 628, etc. can communicate with one or more other computing objects 610, 612, etc. and computing objects or devices 620, 622, 624, 626, 628, etc. by way of the communications network 640, either directly or indirectly. Even though illustrated as a single element in FIG. 6, communications network 640 may comprise other computing objects and computing devices that provide services to the system of FIG. 6, and/or may represent multiple interconnected networks, which are not shown. Each computing object 610, 612, etc. or computing object or device 620, 622, 624, 626, 628, etc. can also contain an application, such as applications 630, 632, 634, 636, 638, that might make use of an API, or other object, software, firmware and/or hardware, suitable for communication with or implementation of the application provided in accordance with various embodiments of the subject disclosure.

There are a variety of systems, components, and network configurations that support distributed computing environments. For example, computing systems can be connected together by wired or wireless systems, by local networks or widely distributed networks. Currently, many networks are coupled to the Internet, which provides an infrastructure for widely distributed computing and encompasses many different networks, though any network infrastructure can be used for example communications made incident to the systems as described in various embodiments.

Thus, a host of network topologies and network infrastructures, such as client/server, peer-to-peer, or hybrid architectures, can be utilized. The "client" is a member of a class or group that uses the services of another class or group to which it is not related. A client can be a process, e.g., roughly a set of instructions or tasks, that requests a service provided by another program or process. The client process utilizes the requested service without having to "know" any working details about the other program or the service itself.

In a client/server architecture, particularly a networked system, a client is usually a computer that accesses shared network resources provided by another computer, e.g., a server. In the illustration of FIG. 6, as a non-limiting example, computing objects or devices 620, 622, 624, 626, 628, etc. can be thought of as clients and computing objects 610, 612, etc. can be thought of as servers where computing objects 610, 612, etc., acting as servers provide data services, such as receiving data from client computing objects or devices 620, 622, 624, 626, 628, etc., storing of data, processing of data, transmitting data to client computing objects or devices 620, 622, 624, 626, 628, etc., although any computer can be considered a client, a server, or both, depending on the circumstances.

A server is typically a remote computer system accessible over a remote or local network, such as the Internet or wireless network infrastructures. The client process may be active in a first computer system, and the server process may be active in a second computer system, communicating with one another over a communications medium, thus providing distributed functionality and allowing multiple clients to take advantage of the information-gathering capabilities of the server.

In a network environment in which the communications network 640 or bus is the Internet, for example, the computing objects 610, 612, etc. can be Web servers with which other computing objects or devices 620, 622, 624, 626, 628, etc. communicate via any of a number of known protocols, such as the hypertext transfer protocol (HTTP). Computing objects 610, 612, etc. acting as servers may also serve as clients, e.g., computing objects or devices 620, 622, 624, 626, 628, etc., as may be characteristic of a distributed computing environment.

Example Computing Device

As mentioned, advantageously, the techniques described herein can be applied to any device. It can be understood, therefore, that handheld, portable and other computing devices and computing objects of all kinds are contemplated for use in connection with the various embodiments. Accordingly, the below general purpose remote computer described below in FIG. 7 is but one example of a computing device.

Embodiments can partly be implemented via an operating system, for use by a developer of services for a device or object, and/or included within application software that operates to perform one or more functional aspects of the various embodiments described herein. Software may be described in the general context of computer executable instructions, such as program modules, being executed by one or more computers, such as client workstations, servers or other devices. Those skilled in the art will appreciate that computer systems have a variety of configurations and protocols that can be used to communicate data, and thus, no particular configuration or protocol is considered limiting.

Figure 7:
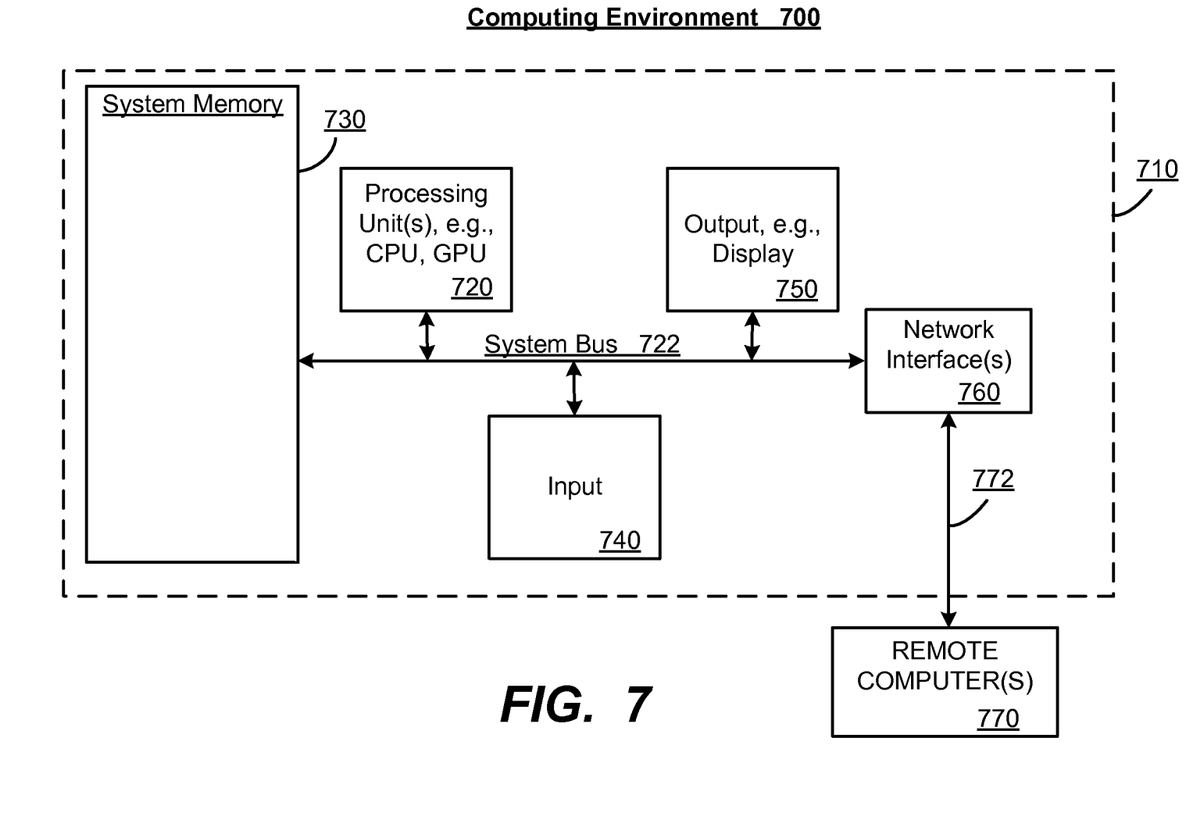
FIG. 7 is a block diagram representing an example non-limiting computing system or operating environment in which one or more aspects of various embodiments described herein can be implemented.

FIG. 7 thus illustrates an example of a suitable computing system environment 700 in which one or aspects of the embodiments described herein can be implemented, although as made clear above, the computing system environment 700 is only one example of a suitable computing environment and is not intended to suggest any limitation as to scope of use or functionality. In addition, the computing system environment 700 is not intended to be interpreted as having any dependency relating to any one or combination of components illustrated in the example computing system environment 700.

With reference to FIG. 7, an example remote device for implementing one or more embodiments includes a general purpose computing device in the form of a computer 710. Components of computer 710 may include, but are not limited to, a processing unit 720, a system memory 730, and a system bus 722 that couples various system components including the system memory to the processing unit 720.

Computer 710 typically includes a variety of computer readable media and can be any available media that can be accessed by computer 710. The system memory 730 may include computer storage media in the form of volatile and/or nonvolatile memory such as read only memory (ROM) and/or random access memory (RAM). By way of example, and not limitation, system memory 730 may also include an operating system, application programs, other program modules, and program data.

A user can enter commands and information into the computer 710 through input devices 740. A monitor or other type of display device is also connected to the system bus 722 via an interface, such as output interface 750. In addition to a monitor, computers can also include other peripheral output devices such as speakers and a printer, which may be connected through output interface 750.

The computer 710 may operate in a networked or distributed environment using logical connections to one or more other remote computers, such as remote computer 770. The remote computer 770 may be a personal computer, a server, a router, a network PC, a peer device or other common network node, or any other remote media consumption or transmission device, and may include any or all of the elements described above relative to the computer 710. The logical connections depicted in FIG. 7 include a network 772, such local area network (LAN) or a wide area network (WAN), but may also include other networks/buses. Such networking environments are commonplace in homes, offices, enterprise-wide computer networks, intranets and the Internet.

As mentioned above, while example embodiments have been described in connection with various computing devices and network architectures, the underlying concepts may be applied to any network system and any computing device or system in which it is desirable to improve efficiency of resource usage.

Also, there are multiple ways to implement the same or similar functionality, e.g., an appropriate API, tool kit, driver code, operating system, control, standalone or downloadable software object, etc. which enables applications and services to take advantage of the techniques provided herein. Thus, embodiments herein are contemplated from the standpoint of an API (or other software object), as well as from a software or hardware object that implements one or more embodiments as described herein. Thus, various embodiments described herein can have aspects that are wholly in hardware, partly in hardware and partly in software, as well as in software.

The word "exemplary" is used herein to mean serving as an example, instance, or illustration. For the avoidance of doubt, the subject matter disclosed herein is not limited by such examples. In addition, any aspect or design described herein as "exemplary" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used, for the avoidance of doubt, such terms are intended to be inclusive in a manner similar to the term "comprising" as an open transition word without precluding any additional or other elements when employed in a claim.

As mentioned, the various techniques described herein may be implemented in connection with hardware or software or, where appropriate, with a combination of both. As used herein, the terms "component," "module," "system" and the like are likewise intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on computer and the computer can be a component. One or more components may reside within a process and/or thread of execution and a component may be localized on one computer and/or distributed between two or more computers.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it can be noted that one or more components may be combined into a single component providing aggregate functionality or divided into several separate sub-components, and that any one or more middle layers, such as a management layer, may be provided to communicatively couple to such sub-components in order to provide integrated functionality. Any components described herein may also interact with one or more other components not specifically described herein but generally known by those of skill in the art.

In view of the example systems described herein, methodologies that may be implemented in accordance with the described subject matter can also be appreciated with reference to the flowcharts of the various figures. While for purposes of simplicity of explanation, the methodologies are shown and described as a series of blocks, it is to be understood and appreciated that the various embodiments are not limited by the order of the blocks, as some blocks may occur in different orders and/or concurrently with other blocks from what is depicted and described herein. Where non-sequential, or branched, flow is illustrated via flowchart, it can be appreciated that various other branches, flow paths, and orders of the blocks, may be implemented which achieve the same or a similar result. Moreover, some illustrated blocks are optional in implementing the methodologies described hereinafter.

CONCLUSION

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

In addition to the various embodiments described herein, it is to be understood that other similar embodiments can be used or modifications and additions can be made to the described embodiment(s) for performing the same or equivalent function of the corresponding embodiment(s) without deviating therefrom. Still further, multiple processing chips or multiple devices can share the performance of one or more functions described herein, and similarly, storage can be effected across a plurality of devices. Accordingly, the invention is not to be limited to any single embodiment, but rather is to be construed in breadth, spirit and scope in accordance with the appended claims.

What is claimed is:

1. In a computing environment, a method performed at least in part on at least one processor, comprising:
   managing, by a node of a computer cluster, execution of one or more job requests received from within the computer cluster, including:
   processing job specification data associated with the one or more job requests;
   automatically generating one or more resource allocation requests based on the job specification data, each of the automatically generated one or more resource allocation requests being mapped to the one or more job requests;
   determining, based upon a policy, which of each of the one or more job requests can have an associated job executed within the computer cluster, and for any job that cannot be executed within the computer cluster, selecting at least a subset of the one or more resource allocation requests corresponding to a job request associated with that job to be communicated to one or more cloud computing resources based on the policy;

communicating at least the subset of the one or more resource allocation requests mapped to that job request without communicating an actual requirement of resources for execution of that job request to a cloud computing provider; and instructing plurality of worker nodes allocated by the cloud computing provider to perform operations corresponding to that job request from the computer cluster, the instructing comprising instructing each of the allocated plurality of worker nodes to perform corresponding tasks based on resource capability available at each of the allocated plurality of worker nodes.

2. The method of claim 1 further comprising:
auditing utilization data for services rendered by the cloud computing provider.

3. The method of claim 2 further comprising:
comparing, after the execution, the utilization data received from the cloud computing provider with results data associated with a performance of one or more job requests by the cloud computing provider to identify irregularities associated with the utilization data, wherein each of the irregularities represents an instance when incorrect utilization data is received from the cloud computing provider.

4. The method of claim 1 further comprising:
communicating data queries to a component of the one or more nodes that is capable of executing the one or more job requests.

5. The method of claim 1 further comprising:
automatically updating results data associated with job request execution with status information from the cloud computing provider.

6. The method of claim 1 further comprising:
selecting one or more specific cloud computing providers to send one or more job requests from a plurality of pending job requests based on the policy and the available resources of the one or more specific cloud computing providers.

7. The method of claim 1 further comprising:
distributing a plurality of processing tasks for each of at least a subset of the resource allocation requests corresponding to the one or more job requests that can be executed within the computer cluster amongst the one or more nodes of the computer cluster.

8. The method of claim 7 further comprising:
selecting a node to execute at least a portion of the plurality of processing tasks based on resource availability.

9. The method of claim 1 further comprising:
handling faults caused by the execution of the one or more job requests, the execution of the one or more job requests being continued despite presence of the faults, wherein the faults are handled by migrating the execution the one or more job requests to another worker node.

10. In a computing environment, a system, comprising:
a memory;
at least one processor coupled to the memory;
an administration mechanism of a node of a computer cluster, the administration mechanism implemented on the at least one processor and manages one or more resource allocation requests for the computer cluster and one or more cloud computing providers, the one or more resource allocation requests being automatically generated and mapped to one or more job requests based on job specification data associated with the one or more job requests, the administration mechanism further determines, based upon a policy, which of the one or more job requests can have an associated job executed within the computer cluster, selects, for any job that cannot be executed within the computer cluster, at least a subset of the one or more resource allocation requests corresponding to a job request associated with that job based on a policy, communicates at least the selected subset of the one or more resource allocation requests mapped to that job request without communicating an actual requirement of resources for execution of that job request to the one or more cloud computing providers, and instructs one or more worker nodes allocated by the one or more cloud computing providers to perform operations corresponding to that job request from the computer cluster, the instructing comprising instructing each of the allocated one or more worker nodes to perform corresponding tasks based on resource capability available at each of the allocated one or more worker nodes.

11. The system of claim 10, wherein the administration mechanism is further configured to monitor performance of a set of job requests to generate results data.

12. The system of claim 10, wherein the administration mechanism is further configured to audit utilization data for the resource allocation requests executed by the at least one or more cloud computing providers and identify irregularities for services rendered by the one or more cloud computing providers.

13. The system of claim 10 further comprising:
a proxy between the one or more cloud computing providers and the computer cluster, wherein the proxy is configured to communicate data from client computers of the computer cluster to one or more worker nodes allocated by the one or more cloud computing providers.

14. The system of claim 10, wherein the administration mechanism is further configured to distribute tasks each the one or more job requests amongst the one or more worker nodes within the one or more cloud computing providers and one or more local nodes within the computer cluster.

15. The system of claim 10, wherein the administration mechanism is further configured to assign tasks for the one or more job requests to one or more nodes that control access to at least a portion of the one or more cloud computing providers.

16. The system of claim 15, wherein the administration mechanism is further configured to instruct another node to execute a portion of the tasks in response to a fault.

17. The system of claim 10, wherein the administration mechanism further updates historical utilization data and improves future job request management based on the updated historical utilization data.

18. One or more computer storage devices having computer-executable instructions, which when executed perform steps, comprising:
identifying, by a node of a computer cluster, processing tasks that form one or more job requests;
automatically generating, by the node of the computer cluster, one or more resource allocation requests based on job specification data associated with the processing tasks, each of the automatically generated one or more resource allocation requests being mapped to the one or more job requests;

determining, based upon a policy, which of the one or more job requests can have an associated job executed within the computer cluster, and for any job that cannot be executed within the computer cluster, selecting at least a subset of the one or more resource allocation requests corresponding to a job request associated with that job to be communicated to a cloud computing provider based on the policy;

communicating at least the subset of the one or more resource allocation requests mapped to that job request without communicating an actual requirement of resources for execution of that job request to the cloud computing provider; and instructing the cloud computing provider to execute the subset of the one or more resource allocation requests using one or more computing resources leased by the cloud computing provider, the instructing comprising instructing each of the leased one or more computing resources to perform corresponding processing tasks based on resource capability available at each of the leased one or more computing resources.

19. The one or more computer storage devices of claim 18 having further computer-executable instructions comprising:
generating performance-related results data associated with the executing step; and
comparing utilization data with the results data to identify irregularities.

20. The one or more computer storage devices of claim 18 having further computer-executable instructions comprising:
selecting a local node to execute at least a portion of the processing tasks in response to the policy and the job specification data.

* * * * *